United States Patent [19]

Wehr

[11] 4,450,032

[45] May 22, 1984

[54] APPARATUS FOR BANDING PARCELS AND THE LIKE

[75] Inventor: Hubert Wehr, Bornheim, Fed. Rep. of Germany

[73] Assignee: Cyklop International Emil Hoffmann KG, Federal Republic of Germany

[21] Appl. No.: 376,578

[22] Filed: May 10, 1982

[30] Foreign Application Priority Data

May 12, 1981 [DE] Fed. Rep. of Germany ....... 3118710

[51] Int. Cl.³ ................. B29C 27/08; B65B 13/32
[52] U.S. Cl. ..................... 156/353; 100/33 PB;
 156/358; 156/494; 156/502; 156/580
[58] Field of Search ............. 156/73.5, 353, 358,
 156/366, 468, 494, 580, 502; 100/29, 33 PB;
 53/589, 399

[56] References Cited

U.S. PATENT DOCUMENTS

| | | | |
|---|---|---|---|
| 3,442,733 | 5/1969 | Vilcins | 156/73.5 |
| 3,799,835 | 3/1974 | Gilmore | 156/358 |
| 4,050,372 | 9/1977 | Kobiella | 156/73.5 |
| 4,096,019 | 6/1978 | Lehmann | 156/580 |
| 4,305,774 | 12/1981 | Wedeking et al. | 156/73.5 |
| 4,313,779 | 2/1982 | Nix | 156/73.5 |

Primary Examiner—Michael G. Wityshyn
Attorney, Agent, or Firm—Lipton, Robert S.

[57] ABSTRACT

An apparatus for securing a tensioned plastic band which has a rotatable tensioning wheel and a friction shoe which is located adjacent a band path for two mutually overlapping end portions of a band located around an article is disclosed. The shoe is reciprocatable transversely to the band path, and displaceable into and out of contact with the upper band end portion. A single drive means is permanently coupled to the shoe for reciprocation, and drives the tensioning wheel via a torque-sensitive coupling. In operation, the shoe is initially out of contact with the band, and the wheel is driven so as to tension the band until a predetermined tension is reached. Thereupon the coupling uncouples, and actuates means which urge the shoe against the band. This causes relative motion of the band ends, resulting in their being frictionally welded together. The uncoupling also actuates a cutting member for the band. Thus the sequence of tensioning, welding and cutting is performed automatically.

13 Claims, 9 Drawing Figures

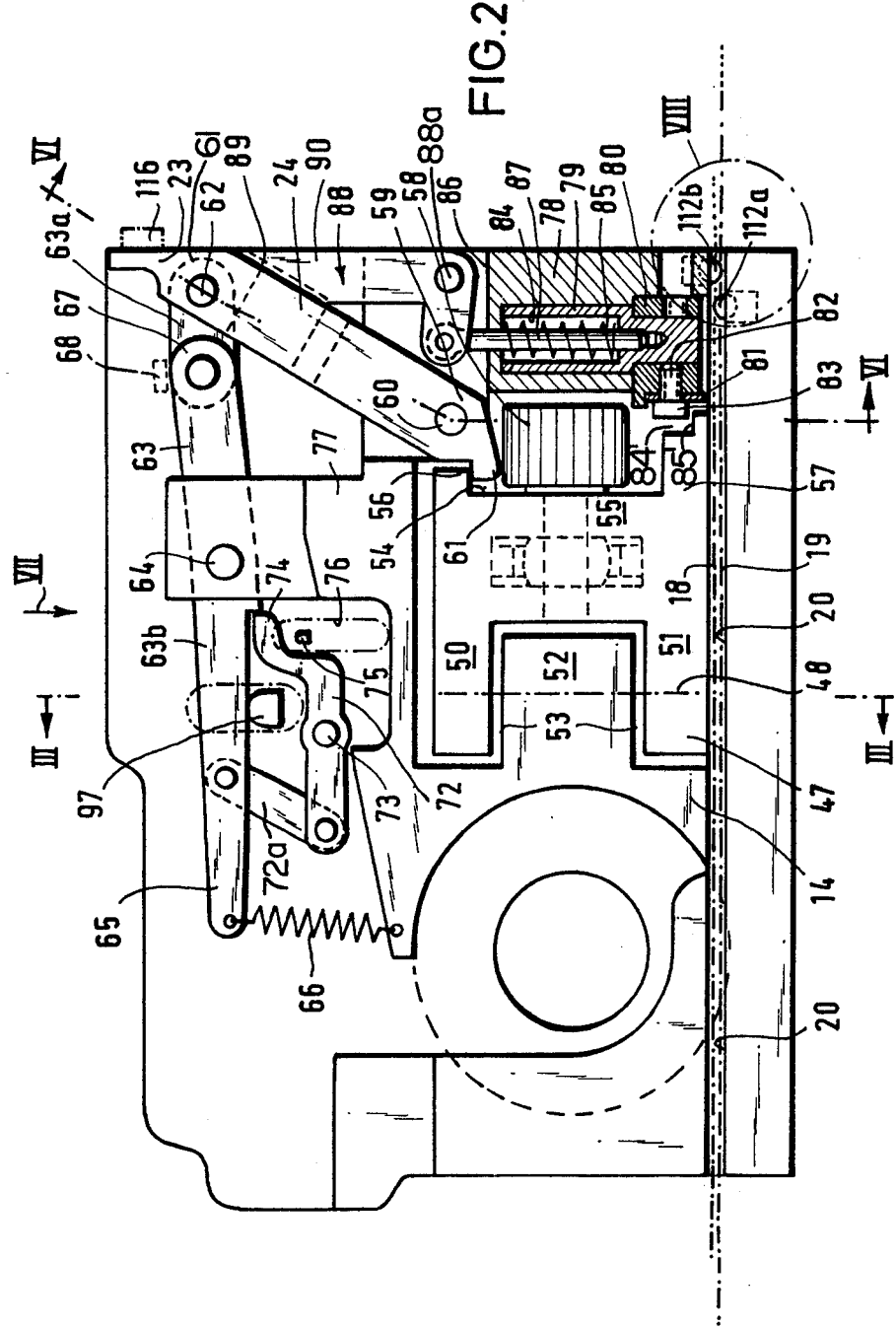

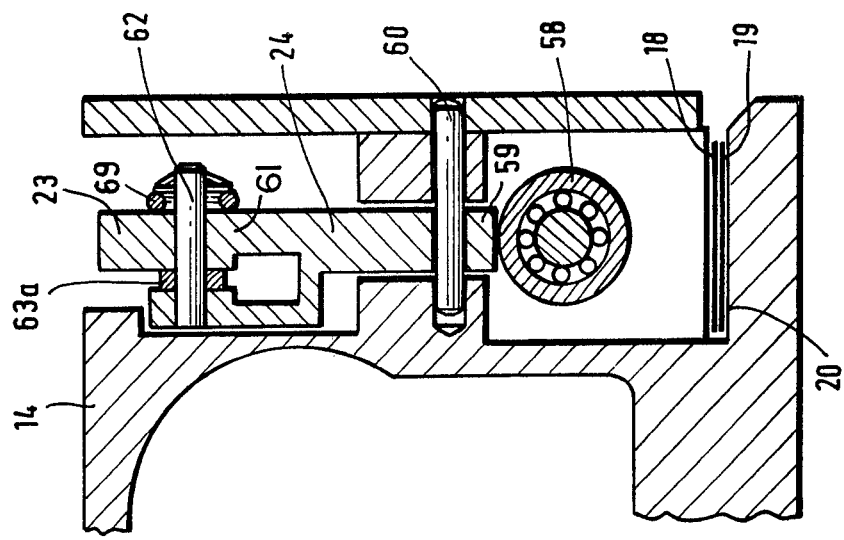
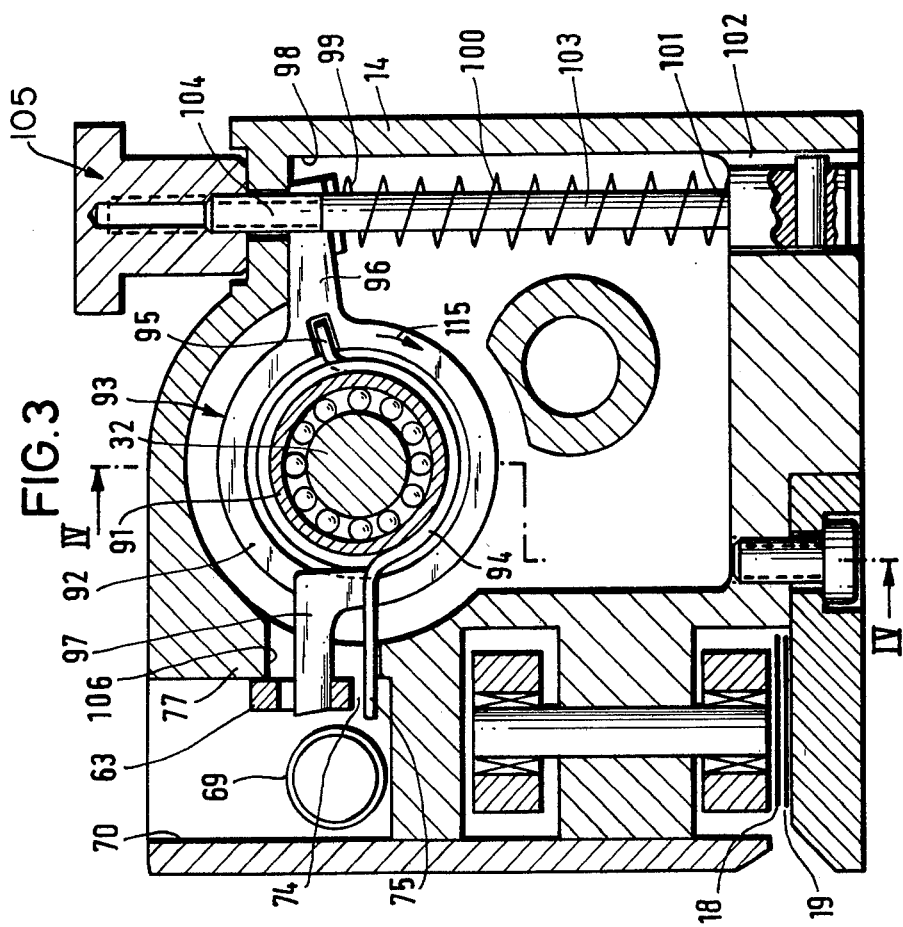

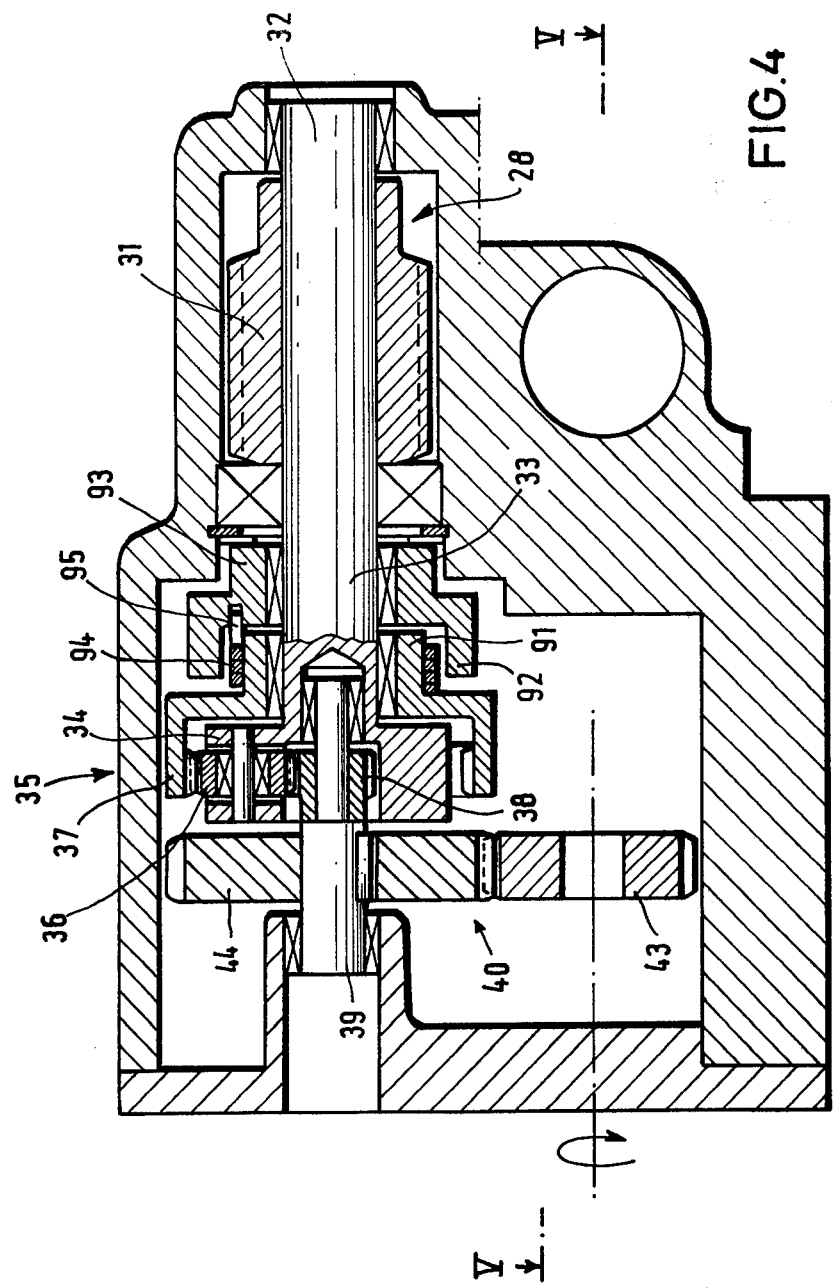

APPARATUS FOR BANDING PARCELS AND THE LIKE

BACKGROUND OF THE INVENTION

The invention relates to an apparatus for banding packages and the like, and particularly to an apparatus for tensioning, sealing and cutting off plastic bands employed for banding or strapping articles, such as packages or the like. Such apparatus includes at least one friction element which is reciprocable by a drive means, and which can be urged by urging means against a first end of a band which overlaps the other end of the band to which it is to be welded by frictional heat, whereby said first end is moved with the friction element relative to the other band end.

In the known devices of this general type, it is necessary to actuate the urging means for the friction element separately as soon as the desired band tension has been attained. It is also necessary to initiate the cutting off operation by a further switching operation as soon as the band ends are welded together. There is a considerable risk that the part of the hoop band which surrounds the parcel will be damaged, so that it may tear subsequently when the hoop band is subject to the stresses of transport.

SUMMARY OF THE INVENTION

Accordingly, it is an object of the present invention to provide an apparatus for binding a package with a tensioned plastic band and welding the ends thereof by frictional heat without damaging the band.

Another object of the present invention is to provide such an apparatus wherein the tensioning, welding and cutting of the band occurs automatically.

A further object of the present invention is to provide such an apparatus wherein the drive means thereof continually causes reciprocation of the friction element and which drives a tensioning wheel through a torque-sensitive coupling which may be adjusted so that tensioning continues until the band has been tensioned to a predetermined degree.

It is a primary object of the present invention to provide such an apparatus wherein the torque-sensitive coupling is disengaged from the tensioning wheel when the desired band tension has been reached, which also causes the friction element to act on the band.

The present invention includes a drive means which causes reciprocation of at least one friction element. The drive means is also connected to a rotatable tensioning wheel which applies tension to the band, by a coupling means. The coupling means has a torque-sensitive means which is actuated when a predetermined degree of torque, which is proportional to the tension in the band, is reached. The invention also includes urging means for causing at least one friction element to be forced against one of the overlapped band ends. When the torque-sensitive means has determined that the desired predetermined degree of torque has been reached, the urging means is actuated causing the band ends to be frictionally welded, and the coupling means is caused to disengage the drive means from the wheel.

Preferred embodiments of the invention enable the disadvantages set out above to be avoided, and to produce a fully or largely automatically operating tensioning, sealing and cutting off apparatus for plastic bands, in which the steps of tensioning, sealing and cutting off occur fully automatically after the plastic band has been inserted and the apparatus actuated.

The invention provides the advantage that the tensioning wheel is automatically disconnected from the drive means when the desired band tension is attained, while simultaneously the friction element is transferred to its operative position and the band ends are joined together by pressure and frictional heat. Preferably, there is a time switch which switches off the drive means after a predetermined time, in which the local softening of the band ends is achieved by friction and the latter can form an intimate joint by fusion.

The controllable coupling may be a solenoid coupling, a hydraulic or compressed-air coupling, or a mechanical coupling. In the preferred embodiment of the invention it has been found to be particularly convenient for the controlled coupling to be a loop spring coupling. A loop spring is used which is looped around a bearing part and/or a transmission part which experiences the transmitted driving torque. The spring can be anchored by one end to a switch member, while its other end is releasable by a part moved when the urging means is actuated.

This form of coupling can be produced easily with simple, customary commercial parts, and ensures reliable operation.

An epicyclic gear is conveniently arranged between the drive means and the tensioning wheel, the sun wheel of which is operatively connected to the drive means and its planet carrier to the tensioning wheel; the controlled coupling is then operatively located between the annular or ring gear (of the epicyclic gear) and the switch member.

With such a design is it possible, not only to obtain the necessary reduction ratio of a high-speed drive motor for the substantially slower-running tension wheel, but also to achieve by means of the ring gear precise control fo the switch member which actuates the urging means for the friction element.

The loop spring is conveniently wrapped around the ring gear of the epicyclic gear. It may then engage with one of its two free end in a rotary-mounted control ring which has two projections, one of which bears upon a spring element which determines the degree torque transmitted, while the second projection serves to actuate a mechanism for unlocking the urging means.

The urging means may comprise a pressure lever, one end of which acts on the friction element, e.g., upon a pressure roller mounted on a movable friction shoe. The upper end of the pressure lever is connected to a pressure spring and articulated to an articulated lever, which in an extended configuration maintains the pressure member in its inoperative position. It is coupled to the second projection of the control ring and also to the second free end of the loop spring in order to release the latter when the lever articulation is deflected. By this means the friction shoe is brought into its operative position and the tensioning wheel is simultaneously disconnected from the drive means, without the operator having to take any action.

In order that the movable friction element which preferably performs its reciprocating motion whenever the drive means is switched on, exerts no influence upon the band during the tensioning, the urging means is suitably provided with a lug which in the inoperative position of the urging means engages beneath a projection arranged on the friction element in order to maintain the element to be spaced from the band portions.

In order to cut off the band coming from the supply, a cutting member is provided so as to be movable transversely to the band plane towards the band to be cut, and immovable parallel to the band plane. The cutting member is adjacent the band portion which is reciprocally moved by the movable friction element. This cutting arrangement reliably prevents damage to the lower band portion which surrounds the parcel during cutting off, because the cutter is stationary with respect to it. The overlapping or upper band portion is reliably cut off by the cutting member, because this portion reciprocates relative to the cutter, thereby achieving the reciprocal movement of cutting member with respect to the band end which is necessary for a smooth cut. In order to reduce the risk of jamming, the cutter is conveniently curved slightly to correspond to the arc which the severed edge of the band end moves during reciprocation.

In order to move the cutting member into the cutting position and to minimize the risk of any damage to the lower band portion, the cutting member is resiliently pressed against the upper band portion.

In order to achieve an automatic cycle, the cutting member is transferred to its inoperative position by an inactivating means connected to the urging means.

The inactivating means for the cutting member may be a cutter tilt lever, one end of which is articulately connected to the cutter holder, and the other end of which abuts the pressure lever of the urging means.

In order to permit movement of the upper band portion with reference to the lower one, and to prevent the band portions from slipping sideways out of the apparatus, there is preferably a channel in which the band portions to be joined together are located. The channel is bounded on its longitudinal sides by spring loaded rolling elements. These rolling elements may be balls which bear on one of the upper and lower surfaces which form the band channel. The balls are placed on springs positioned in bore holes in the surface opposite the surface the balls rest upon. In order to ensure correct guidance, the rolling elements are preferably arranged in pairs beside both longitudinal edges of the band ends, and are arranged alternately in the upper and lower surfaces which form the band channel.

Further desirable objects, features, and advantages will be apparent from the following description of the invention, made with reference to the accompanying drawings.

BRIEF DESCRIPTION OF THE DRAWINGS

FIG. 2 shows the apparatus of FIG. 1 in a vertical partial longitudinal section, some of the parts being omitted for clarity;

FIG. 3 is a vertical partial cross-section along line III—III in FIG. 2;

FIG. 4 is a vertical partial longitudinal section along the line IV—IV of FIG. 3, showing the drive transmission;

FIG. 6 is a partial section along the line VI—VI in FIG. 2;

DESCRIPTION OF THE PREFERRED EMBODIMENT

Figure 1:
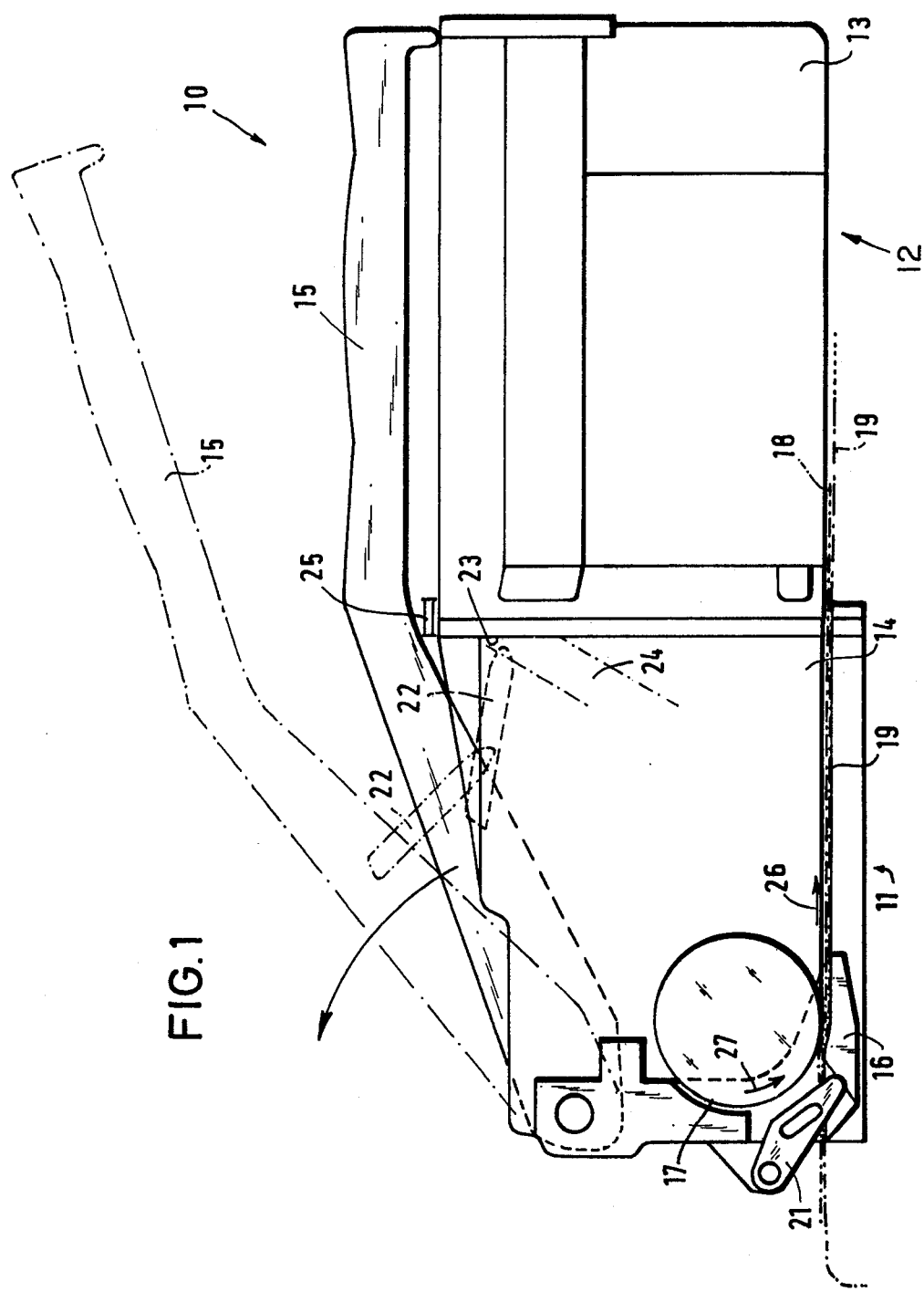
FIG. 1 shows a side elevation view of an apparatus for tensioning, sealing and cutting off plastic bands which bind a parcel.

In the drawings, 10 designates a tensioning, sealing and cutting off apparatus for binding a parcel with a plastic band. It has in its front part 11, the units for the tensioning, sealing and cutting off a band wrapped around a parcel. In its rear part 12 are the drive motor 13 and the electrical switching and control elements. All the parts are enclosed by a housing 14, which is overhung in the longitudinal direction of the apparatus by a manual lever 15, with which an abutment plate 16 can be lifted from a tensioning wheel 17, so that two band ends 18 and 19 can be inserted in a band guide channel 20 between the tensioning wheel 17 and the abutment plate 16 from the side, i.e., from the front in FIG. 1. When inserting the bands, a laterally positioned band guide lever 31, which can be adjusted transversely to the longitudinal direction of the apparatus to permit the use of bands of different widths, is pivoted upwards.

A pivotable pressure rod 22 extends inwardly from the manual lever 15 and acts upon the upper end 23 of the pressure member 24, which is described more fully below and with which a movable friction shoe can be displaced into its initial position, which likewise will be described more fully below.

Located on the top side of the housing 14 is a switch 25, by which the automatic control mechanism, not shown in detail here, for drive motor 13 can be switched on.

Figure 5:
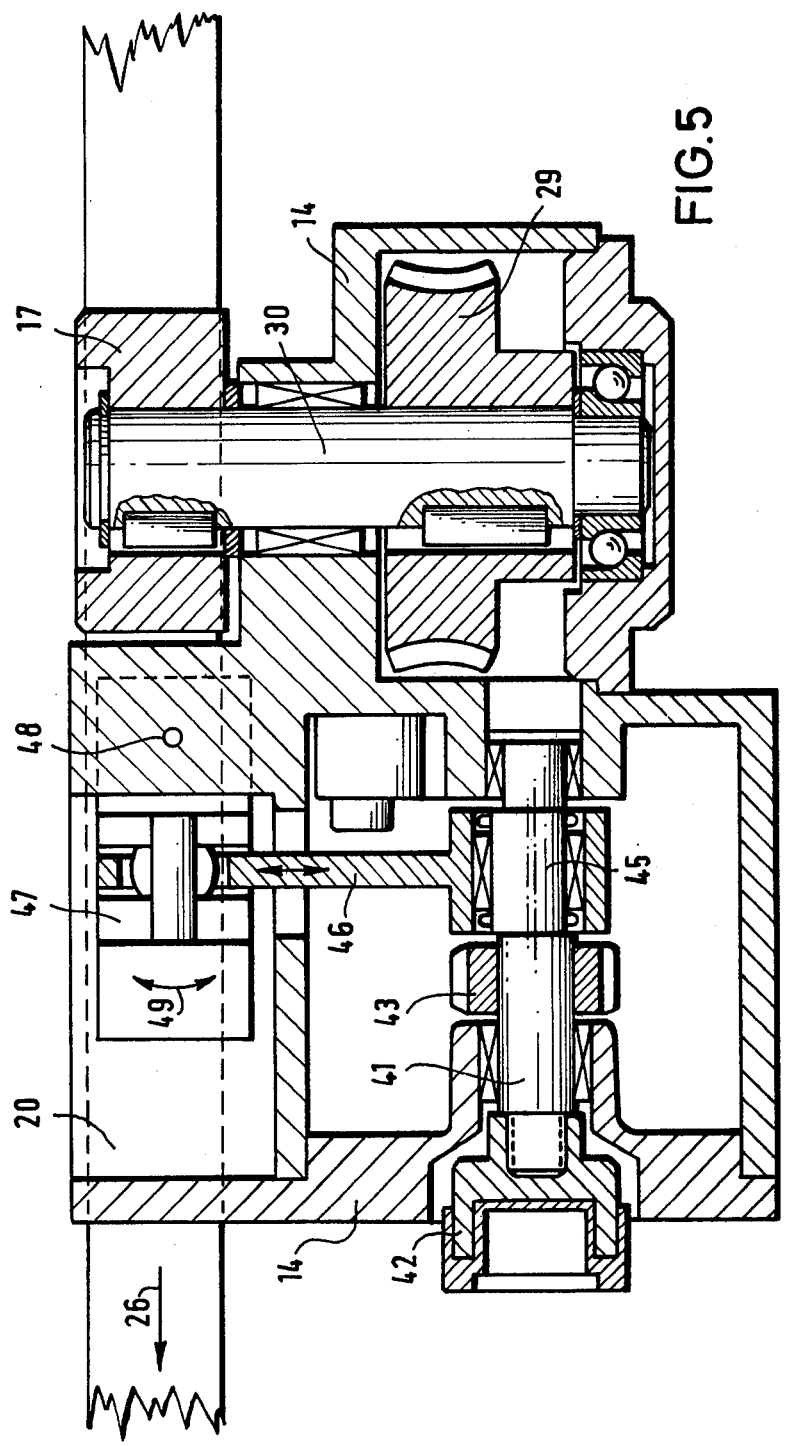
FIG. 5 is a horizontal section along the line V—V in FIG. 4.

The tensioning wheel 17 rests firmly upon the upper band end 18, which is pressed by the abutment plate 16 towards the tensioning wheel. The band end 18 is drawn backwards by the wheel in the direction of the arrow 26, while the tensioning wheel rotates in the direction of the arrow 27. The tensioning wheel 17 is mounted rotatably (FIG. 5) in the housing 14 in the front part 11 of the apparatus 10 and is set in motion by a worm drive or worm gear assembly 28, the worm wheel or gear 29 of which is mounted on the tensioning wheel shaft 30 and is driven by a worm 31 which extends in the longitudinal direction of the housing (FIG. 4) and the worm shaft 32 of which is firmly connected at its rear end 33 to a planet carrier 34 of an epicyclic gear or planet gear assembly 35. The planet gears 36 mounted in the planet carrier 34 mesh on the one hand with a ring gear 37 and on the other hand with a sun gear 38. The sun gear 38 is mounted on the output shaft 39 of a drive gear assembly 40, the input shaft 41 of which is connected by a coupling 42 to the drive motor 13 (FIG. 5).

The input shaft 41, which is mounted in the housing 14 parallel to the output shaft 39 and which carries a pinion 43 which meshes with a gear 44 mounted on the output shaft 39. The input shaft also has mounted rotatably on it an eccentric 45 which drives, through a connecting rod 46, a movable friction shoe 47 which is located above the band guide channel 20 at the front side of the apparatus and is reciprocally pivotable in the direction of the arrow 49 about a vertical axis 48 (FIG. 5).

As shown in FIG. 2, the movable friction shoe 47 has a somewhat H-shaped configuration in longitudinal section and overlaps by its two front arms 50 and 51 a bearing block 52 in the housing 14, which also contains the vertical axis 48, about which the movable friction shoe 47 can not only pivot, but can also move up and down within certain limits in its longitudinal direction. To make this possible, sufficient play is present between the bearing block 52 and the front arms 50 and 51 of the movable friction shoe 47.

Mounted rotatably on the rear end face 54 of the web 55 of the H-shaped friction shoe 47, between the two rear arms 56 and 57, is a pressure roller 58 which consists of a ball-bearing-mounted ring, as may best be seen in FIG. 6. This pressure roller 58 is loaded by the pressure member 24 already mentioned above, which consists of a pressure lever which is mounted pivotably by its lower end 59 in the housing 14 about a journal 60. The pressure member 24 also has as its lower end a forward projecting lug 61, by which it engages beneath the upper rear arm 56 of the friction shoe 47. It thus acts to maintain the movable friction shoe 47 in its upper inoperative position in which it leaves the band guide channel 20 clear and does not influence the band ends 18 and 19.

The pressure member 24 is articulated at its upper end 61 by a joint bolt 62 to the rear part 63a of an articulated lever 63. This lever 63 has front and rear parts 63b, 63a coupled by an articulated joint 67. The front part 63b is mounted pivotably on a horizontal pivot axis 64 in the housing 14 and extends forward of the axis. The front end 65 of the articulated lever 63 is engaged by a tension spring 66 which is attached to the housing 14 and urges the front end 65 of the articulated lever 63 downwards, thereby pivoting the articulated lever 63 counterclockwise about its pivot axis 64. The lever 63 is thereby deflected slightly upwards at its articulated joint 67, until it abuts stop 68.

Figure 7:
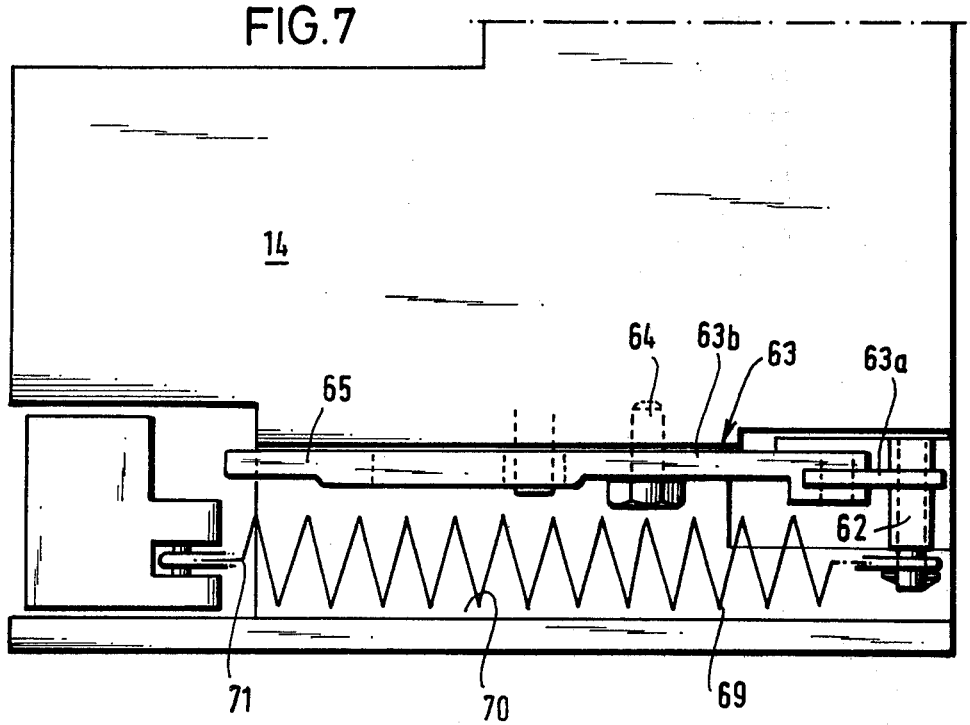
FIG. 7 is a partial plan view of the apparatus in which the tensioning and actuating lever is omitted, viewed in the direction of the arrow VII in FIG. 2.

The joint bolt 62 is connected to one end of a strong tension spring 69, which extends approximately horizontally in a channel 70 of the housing and is anchored at its rear end 71 in the housing 14 (FIG. 7). The spring 69 urges the pressure member 24 to pivot counterclockwise, but this is presented by the articulated lever 63 when the latter has its extended configuration as shown in FIG. 2, i.e., when its articulated joint 67 abuts against the stop 68.

It will be seen in FIG. 2 that there is a lever 72a pivotally connected to the front end 65 of the articulated lever 63. This lever 72a is articulated to a tilt lever 72 which can pivot about a tilt lever axis 73 mounted in the housing. The tilt lever 72 at its rear cranked end 74 upon one end 75 of a loop spring 94 which projects through an elongate aperture 76 in a partition wall 77 of the housing into the region of the lever linkage, and the function of which will be explained more fully below.

As is clear from FIG. 2, there is present at the rear end of the front part 11 of the apparatus 10, above the band guide channel 20, a cutter guide block 78 in which a cutter guide sleeve 79 is mounted for vertical sliding, and carries at its lower end a cutter holder 80, to the front side of which a cutting element 81, e.g., a knife blade is attached by set screws 82.

The knife blade of the cutting element 81 is of partial cylindrical construction and curved in a circular arc, the center of which lies the axis 48 of the movable friction shoe.

The cutter guide sleeve 79 has a blind bore 84, open towards the top, in which is positioned a compression spring 85 which is braced on one end against the bottom of the blind bore 84 and on the other end against the upper end 86 of the cutter guide block 78. Thus it urges the cutter guide sleeve 79, with the cutter holder and with the cutting element 81 attached thereto, downwards. The compression spring 85 surrounds a traction rod 87 which is attached to the lower part of the cutter guide sleeve 79, passes through the upper end 86 of the cutter guide block 78, and is articulated by its free upper end to an angle lever 88 which is braced by the bevelled end 89 of its other, free arm 90 against the rear edge of the pressure element 24. The angle lever 88 is pivotally connected to the housing 14 by journal 88a.

It is clear from FIG. 2 that the angle lever 88, in its position illustrated in FIG. 2, draws the cutter guide sleeve 79, and with it the cutter holder and the cutting element 81, counter to the action of the compression spring 85, and maintains the cutting member in its inoperative position.

Turning now to FIGS. 3 and 4, we see that the ring gear 37 is mounted rotatably on the worm shaft 32 by a ring flange 91 which is surrounded at a distance by a flange part 92 of a control ring 93 which is likewise mounted rotatably on the worm shaft 32. On the ring flange 91 of the ring gear 37 there is wound under tension a loop spring 94, of which the end 75 projects out through the elongate aperture 76 of the partition wall 77 and abuts the cranked end 74 of the tilt lever 72, as has already been described above. The rear end 95 of the loop spring 94 is firmly connected to the control ring 93 (FIG. 4).

FIG. 3 shows that the control ring 93 has a first projection 96 extending radially outwards and a second projection 97, approximately diametrically opposite the latter, which likewise extends radially outwards. The first projection 96 of the control ring 93 engages into a recess 98 of the housing 14 and rests upon one end 99 of a spring element 100, which in the illustrated embodiment is a compression spring whose other end 101 is braced against the abutment 102 which is carried by an adjusting spindle 103 which projects out of the housing 14 by its upper screw threaded end 104 onto which an adjusting nut 105 is screwed to permit adjustment of the spring tension of the spring element 100.

The second projection 97 of the control ring 93 projects through an aperture 106 in the partition wall 77 of the housing into the channel 70 and is positioned beneath the articulated lever 63 forward of the pivot axis 64.

Figure 8:
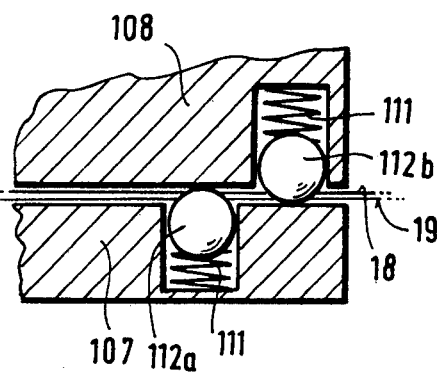
FIG. 8 shows a detail of FIG. 2 on a larger scale.
Figure 9:
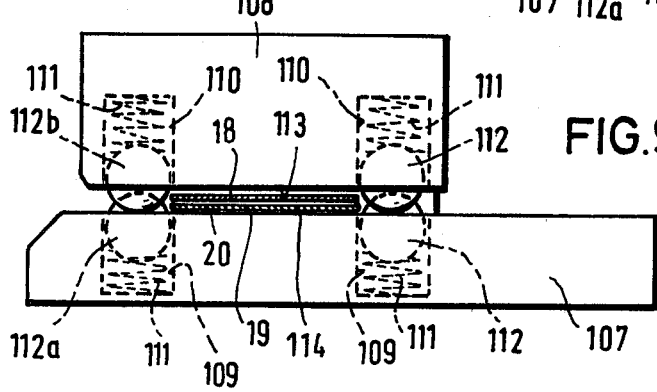
FIG. 9 shows a partial elevation view of FIG. 2, which illustrates the end of the band guide means, likewise on a larger scale.

In order to enable the band ends 18 and 19 to be pushed easily into the band guide channel and to anchor them there securely without lateral pivoting movement of the upper band end 18 relative to the lower band end 19 being obstructed, blind bores 109 and 110, which receive rolling elements 112, conveniently balls, loaded by compression springs 111, are arranged, in the baseplate 107 of the apparatus and in the intermediate plate 108 covering the top of the band guide channel 20, on both longitudinal sides of the band channel (FIGS. 8 and 9). The rolling elements 112 protruding out of their bores 109 and 110 respectively abut the opposite surfaces 113 and 114, which form the band guide channel 20, i.e., the rolling elements 112a arranged in the base plate 107 are pressed by their springs 111 against the lower surface 113 of the intermediate plate 108, whereas the rolling elements 112b arranged in the blind bores 110 of the intermediate plate 108 are pressed by their springs 111 against the upper surface 114 of the base plate 107.

It will be seen in FIG. 2, but more clearly in FIGS. 8 and 9, that the rolling elements 112 in each case are arranged in pairs beside the band ends 18 and 19 and the pairs of rolling elements 112a arranged in the base plate 107 are spaced in the longitudinal direction of the band from the rolling elements 112b in the intermediate plate 108.

The principle of operation of the illustrated embodiment of the invention will now be described.

After the band has been wrapped around the package or parcel, (not shown) the band ends 18 and 19 are inserted from the side of the device into the band guide channel 20, with the abutment plate 16 raised from the tensioning wheel 17 by means of the manual lever 15. The lever 15 is then released so that the abutment plate 16 presses the band ends 18 and 19 against the tensioning wheel 17. After this the drive motor 13 is switched on by the switch 25 via the control mechanism, not shown.

The rotating input shaft 41 causes reciprocating motion of the connecting rod 46, which causes reciprocal pivoting of the movable friction shoe 47 in a transverse direction. The shoe 47 is in its raised position illustrated in FIG. 2, with the upper rear arm 56 of the shoe braced against the lug 61 of the pressure member 24. Consequently it does not contact the upper band end 18, but moves freely above the band ends.

Simultaneously the sun gear 38 is driven via the drive gear assembly 40, and drives the planet gears 36. Since the ring gear 37 of the planet gear assembly 35 is restrained via the loop spring coupling 94 by the initially immovable control ring 93, the planet gears 36 rolling the female tooth system of the ring gear 37 and thereby rotate the worm shaft 32 which is firmly connected to the planet carrier 34, and which drives, through the worm gear 29, the tensioning wheel shaft 30, so the tensioning wheel 17, which is firmly connected to this shaft, is rotated and draws the upper end 18 of the hoop band through the apparatus in the direction of the arrow 26. This puts the band under tension, since the lower band end 19 is firmly clamped in the apparatus in a manner not shown in detail here.

As soon as the band tension exceeds the preset value determined by the spring element 100, the torque transmitted from the ring gear 37 through the loop spring coupling 94 to the control ring 93 overcomes the spring power of the spring element 100, upon which the first projection 96 of the control ring rests. This causes the control ring 93 to commence rotating clockwise in FIG. 3, as is indicated there by the arrow 115. This rotation has the effect that the second projection 97 of the control ring 93 raises the front end of the articulated lever 63 in FIG. 2 counter to the action of the tension spring 66. The articulated joint 67 of the articulated lever 63 then moves downward, so that the pressure member 24 loses its support at its upper end, and is pivoted forward (counterclockwise) by the tension spring 69 (FIG. 7). This causes the lug 61 to release the movable friction shoe 47, and the lower end 59 of the pressure member 24 presses against the pressure roller 58 mounted on the rear end face 54 of the movable friction shoe 47. This causes the movable friction shoe 47, which is still moving in reciprocation as the drive means continues to run, to be pressed downward and to engage the upper band end 18. This reciprocal pivoting motion (about the vertical axis 48) under the lever pressure exerted by the pressure member 24 causes frictional heat to be generated, by which the surfaces of the band ends rubbing against each other become softened, so that a fusion joint can be obtained when the friction shoe 47 is subsequently stopped under pressure.

When the pressure member 24 pivots forward under the action of the spring 69, the angle lever 88, which is, of course, in abutment with its rear edge, pivots with it. The cutter guide sleeve 79 and the cutter holder 80 connected to it therefore become free and are pressed downward by the compression spring 85 until the screw heads 83 of the screws 82 rest upon the upper surface 85 of the rear lower arm 57 of the movable friction shoe 47 in the cavity 84. Since the upper band end 18 pivots in reciprocation transverse to the longitudinal direction of the band beneath the cutting element 81, which is now depressed, this causes it to be cut off by the cutting element 81, which, however, does not touch the lower band end 19 at all.

When the pressure member 24 pivots forward counterclockwise, a switch 116 is actuated, which was hitherto depressed and maintained in its inoperative position by the upper end 23 of the pressure member 24. This switch 116 trips a time switch mechanism which makes the drive motor 13 continue to run for a time period which is selected so that the movable friction shoe 47, which is reciprocally pivoted by the drive motor under the pressure of the pressure member 24, can generate the heat necessary for the frictional welding process so that the mutually superposed band ends are softened to the desired degree.

Simultaneously with the pivoting of the articulated lever 63, the tilt lever 72 is also pivoted clockwise by the lever 72a, while its crank 74 presses upon the one end 75 of the loop spring coupling 94. The loop spring coupling 94 is thereby disengaged, so that the ring gear can rotate unobstructedly on the worm shaft 32. The sun gear 38 of the planet gear assembly 35 then, via the planet gears 36, drives the ring gear 37 in rotation, and the planet carrier and the worm gear assembly 28 connected with it remain stationary. The tension wheel 17 is thereby caused to stop rotating thus maintaining the desired band tension.

When the time set by the time switch mechanism has expired, it switches off the drive motor 13 via the control circuit in a manner not shown in detail. This stops the reciprocation of the movable friction shoe 47, while the pressure exerted by the pressure member 24 upon the friction shoe is maintained. The band ends pressed firmly against each other can therefore weld together in the heated region. They thus form a joint with high tensile strength.

Then, by depressing the manual lever 15, the abutment plate 16 can be withdrawn from the tensioning wheel 17 and the apparatus 10 can be displaced laterally from the hoop formed by the band about the package. In the process the rolling elements 112 are pushed into their blind bores 109 and 110, so that the band can slide sideways out of the band guide channel 20.

When the manual lever 15 is depressed the pivotable pressure rod 22 associated with it engages against the upper end 23 of the pressure member 24 and presses it counter to the action of the spring 69 back into its initial position shown in FIG. 2, whilst the angle lever 88 is simultaneously pivoted and the cutting device is thereby retracted. The upper end 23 of the pressure member 24 also presses again against the switch 116 and brings the latter into its initial position.

The invention is not limited to the described embodiment, and numerous modifications and variations are possible without departing from the scope and spirit of the invention. As has already been mentioned, it is possible to use a magnetic ratchet, compressed air, or hydraulic coupling to disconnect the tensioning wheel from the drive and for the simultaneous actuation of the friction member, instead of the loop spring coupling illustrated and described. It is also possible to use other tensioning devices, e.g., belt tensioning devices, or to use a hydraulic pressure member instead of the pressure lever to depress the movable friction shoe.

What is claimed is:

1. An apparatus for securing a band around an article, comprising:
   a rotatable tensioning wheel for applying tension to a band;
   a unidirectional drive means;
   coupling means operationally intermediate said drive means and said wheel whereby said wheel is rotatable by said drive means;
   at least one frictional element arranged to be reciprocable by said drive means;
   urging means for urging said at least one friction element against a first portion of a band which overlies a second portion of the band, said portions being tensionable by said tensioning wheel, while said at least one element is reciprocated by said drive means, whereby the first band portion is reciprocable relative to and in contact with the second band portion;
   wherein said coupling means includes means for maintaining band tension and means sensitive to the torque transmitted from the drive means to the wheel, said torque sensitive means being actuated when the torque attains a predetermined value to automatically actuate said urging means to effect said urging of said at least one friction element, and to control the torque transmitted to the wheel, and wherein on sensing said predetermined torque value said torque sensitive means automatically actuates uncoupling of the tensioning wheel from the drive means and automatically actuates said means for maintaining band tension by preventing the uncoupled tensioning wheel from rotating.

2. An apparatus according to claim 1 wherein said coupling means comprises a rotatory element which in use is subject to the torque being transmitted by the coupling means, and loop spring means looped around said rotary element and arranged to transmit torque to the tensioning wheel; said spring means having first and second end portions, said first end portion being coupled to the torque sensitive means and said second end portion being coupled to the urging means so that said actuation of the urging means causes said urging means to act on said second end portion to effect uncoupling of the tensioning wheel from the drive means.

3. An apparatus according to claim 1 wherein said coupling means comprises an epicyclic gear comprising a ring gear, a sun wheel and a planet carrier, said sun wheel and said planet carrier being operatively connected to the drive means and to the tensioning wheel respectively; and wherein the control of the torque transmitted to said tensioning wheel is effected by a coupling operatively intermediate the ring gear and the torque sensitive means.

4. An apparatus according to claim 3 wherein said coupling intermediate the ring gear and the torque-sensitive means comprises a loop spring means wrapped around the ring gear of the epicyclic gear and wherein said torque-sensitive means comprises a rotatably mounted control ring having first and second projections, and a spring element whose spring force determines said predetermined torque value, said loop spring means having a first end portion which engages said control ring, whose said first projection bears on said torque determining spring element, and whose said second projection is arrangd to effect said actuation of said urging means.

5. An apparatus according to claim 4 further comprising an articulated lever, and wherein the urging means comprises a pressure spring and a pressure lever having two distal end portions whereof one acts upon the friction element to effect said urging, the other said end being connected to said pressure spring and articulated to said articulated lever; said articulated lever being so arranged that in one configuration it prevents said pressure lever from effecting said urging; said articulated lever being displaceable from said configuration by said ring; and wherein said loop spring means has a second end portion which is coupled to the articulated lever, deflection of the lever articulation being arranged to cause the loop spring means to effect uncoupling of the tensioning wheel from the drive means.

6. An apparatus according to claim 1 wherein the urging means and the friction element have mutually engageable detent means which are engageable when the urging means is not urging the friction element in order to maintain the friction element spaced from the band portions.

7. An apparatus according to claim 1 further comprising a cutting member movable transversely to the band plane and immovable parallel to the band plane, above said reciprocable band portion.

8. An apparatus according to claim 7 wherein the cutting member is curved in a circular arc, and the reciprocation of the friction element is rotary motion coaxial with the arc of said cutting member; the apparatus further including resilient urging means for urging the cutting member against said reciprocable band portion.

9. An apparatus according to claim 8 including cutting member inactivating means for displacing said cutting member to a non-cutting configuration, counter to the action of the urging means; said inactivating means being coupled to the friction element urging means.

10. An apparatus according to claim 9 wherein said inactivating means for the cutting member comprises an angle lever, one end of which is connected articulately to the cutting member, and the other end of which abuts the friction element urging means.

11. An apparatus according to claim 1, including a band guide channel for guiding the band portions to be joined together, said guide channel having elongate opposed surface portions whose longitudinal sides are formed by spring-loaded rolling elements.

12. An apparatus according to claim 11 wherein said surface portions have bores, wherein each of said bores contains a spring means, and wherein the rolling elements are balls which rest on the surface portions, and are forced counter to said spring means into their respective bores in the opposite surface portions.

13. An apparatus according to claim 11 wherein the rolling elements are arranged in pairs beside each longitudinal edge of the band guide channel, each pair having a respective element associated with each of the opposed surface portions of the guide channel.

* * * * *